US010867535B2

(12) United States Patent
Bandishti

(10) Patent No.: US 10,867,535 B2
(45) Date of Patent: Dec. 15, 2020

(54) SYSTEMS AND METHODS FOR SELECTING A REGION OF A FLEXIBLE SCREEN AND CONTROLLING VIDEO PLAYBACK

(71) Applicant: Rovi Guides, Inc., San Jose, CA (US)

(72) Inventor: Vinayaka Prakasha Bandishti, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/141,617

(22) Filed: Sep. 25, 2018

(65) Prior Publication Data

US 2020/0098293 A1  Mar. 26, 2020

(51) Int. Cl.
*G09G 3/00* (2006.01)
*G06F 1/16* (2006.01)

(52) U.S. Cl.
CPC .......... *G09G 3/001* (2013.01); *G06F 1/1652* (2013.01); *G09G 2380/02* (2013.01)

(58) Field of Classification Search
None
See application file for complete search history.

(56) References Cited

U.S. PATENT DOCUMENTS

| | | | | |
|---|---|---|---|---|
| 7,456,823 B2 * | 11/2008 | Poupyrev | ................. | G06F 3/011 178/18.06 |
| 2004/0008191 A1 | 1/2004 | Poupyrev et al. | | |
| 2010/0141605 A1 * | 6/2010 | Kang | .................... | G06F 1/1626 345/174 |
| 2012/0115422 A1 * | 5/2012 | Tziortzis | ................... | G06F 3/01 455/73 |
| 2013/0093660 A1 * | 4/2013 | Hirsch | .................. | G06F 1/1652 345/156 |
| 2013/0154971 A1 * | 6/2013 | Kang | ..................... | G06F 3/0414 345/173 |
| 2013/0222207 A1 * | 8/2013 | Baek | ......................... | G06F 5/00 345/1.1 |
| 2013/0222416 A1 | 8/2013 | Kim et al. | | |
| 2013/0265221 A1 * | 10/2013 | Lee | ............................ | G06F 3/01 345/156 |
| 2013/0296000 A1 * | 11/2013 | Park | ....................... | G09G 3/001 455/566 |
| 2014/0028596 A1 * | 1/2014 | Seo | ........................ | G06F 3/0487 345/173 |
| 2014/0055375 A1 * | 2/2014 | Kim | ...................... | G06F 1/1652 345/173 |
| 2014/0062976 A1 | 3/2014 | Park et al. | | |
| 2014/0078047 A1 * | 3/2014 | Seo | ........................ | G06F 3/0487 345/156 |
| 2014/0101560 A1 * | 4/2014 | Kwak | .................... | G06F 1/1652 715/738 |
| 2014/0215411 A1 * | 7/2014 | Kong | ....................... | G06F 3/017 715/863 |
| 2015/0309611 A1 | 10/2015 | Vertegaal et al. | | |
| 2017/0262123 A1 * | 9/2017 | Horikoshi | ............. | G06F 3/0483 |
| 2018/0275763 A1 * | 9/2018 | Kim | ...................... | G06F 1/1652 |

* cited by examiner

*Primary Examiner* — David D Davis
(74) *Attorney, Agent, or Firm* — Haley Guiliano LLP

(57) ABSTRACT

Methods and systems are provided for controlling the presentation of media on a flexible screen based on a detected curvature of the flexible screen. For example, a mobile device may display a video on a flexible screen. When the mobile device detects a bend in the flexible screen, the mobile device will determine a direction of the bend (e.g., into or out of the screen) and will play the video in a direction based on on the direction of the bend (e.g., in forward or in reverse).

12 Claims, 13 Drawing Sheets

900

902 — Identify an object generated for display in the selected region of the flexible screen

904 — Determine the dimensions of the object

906 — Are portions of the object outside of the selected region?

908 — End (No)

910 — Adjust the size of the selected region to match the dimensions of the object (Yes)

SYSTEMS AND METHODS FOR SELECTING A REGION OF A FLEXIBLE SCREEN AND CONTROLLING VIDEO PLAYBACK

BACKGROUND

This disclosure is generally directed to improved user interface of electronic devices that have a flexible screen. In particular, methods and systems are provided for object selection and media asset presentation control based on the state of the curvature of the flexible screen.

SUMMARY

Conventional electronic devices (e.g., mobile electronic devices or wearable electronic devices) with a flexible screen continue to rely on outdated touch input from a user to select portions of the flexible screen, to select objects displayed on the flexible screen, and to control presentation of media assets that are being displayed on the flexible screen. For example, to accomplish selection of an area of the screen, a conventional electronic device with a flexible screen has to receive a complicated series of touch inputs. For example, the electronic device has to detect two fingers dragging across the screen. Due to the difficulty required, such inputs often result in a selection of a wrong portion of a display. In another example, it may be default for a user to select, by touch, an object that is moving around on the screen as part of a media asset. Often a media asset has to be paused to allow the selection of an object by touch. In another example, to receive a media asset presentation control command (e.g., pause, rewind, or fast-forward command), a conventional electronic device with a flexible screen has to receive a touch input from the user of an appropriate area of the flexible screen (e.g., a touch of a pause button, a touch of a rewind button, or a touch of a fast-forward button). Requiring a user to touch a button may be burdensome, as it often require a use of two hands (e.g., one hand to hold the device and one hand to touch the button). Furthermore, display of control buttons typically obscures the media asset itself, which is undesirable. Touch input on a flexible screen may also be unreliable because a user touch may accidentally deform the screen instead of making a touch selection.

Accordingly, method and systems described herein leverage functionalities of electronic devices (e.g., mobile electronic device or wearable electronic devices) with flexible screens to solve the aforementioned problems by providing an electronic device with a capability to select portions of the screen, select moving objects, and control presentation of media assets based on properties of the curvature of the flexible screen. In some embodiments, an electronic device detects properties of the curvature of the flexible screen (e.g., after the display was bent by the user) and performs an appropriate user interface action using techniques describe in more detail below. Advantageously, these techniques may be performed solely by analyzing the curvature of the flexible screen and without requiring any kind of a touch input from the user.

In one embodiment, to accomplish a selection of a portion of a screen, a user may simply bend the flexible screen. The user interface application may then select a portion of a screen centered around the vertex of the curvature of the screen. Additionally, the size of the selected portion may be proportional to the degree of the curvature. In another embodiment, to accomplish a selection of a moving object, the user may bend the display such that the vertex of curvature of the screen tracks the location of the object. The user interface application may detect that the vertex of curvature tracks a location of a displayed object and select that object. In yet another embodiment, the user interface application checks the curvature of the flexible screen during a presentation of a media asset to control presentation direction and presentation speed for the media asset. For example, if the screen is bent out of a top plane of the screen, the user interface application may play the media asset backwards, while if the screen is bent into the top plane of the screen the media asset may play the media asset forwards. Additionally, when the curvature of the display is high, the user interface application may play the media asset at a high speed, while when the curvature of the display is low, the user interface application may play the media asset at a low speed.

A user interface application of an electronic device detects curvature of a flexible screen. The user interface application analyzes properties of the curvature. For example, the user interface application may analyze values provided by a plurality of sensors that measure strain across different portions of the flexible screen to acquire properties of the curvature. In some embodiments, the user interface application determines a vertex point of the curvature as the part of the screen that is bent the most (e.g., a part of screen with highest associated strain measurement). The user interface application may also determine a degree of the curvature of the flexible screen. For example, the degree of the curvature may be calculated based on a radius of the curvature (e.g., a small radius may indicate a sharp bend, while a large radius may indicate a shallow bend). The user interface application may also determine the direction of the curvature. For example, the user interface application may determine if the screen is bent in or bent out, and whether the screen is bent horizontally or vertically. In some embodiments, the determined properties may be used by the user interface application to accomplish user interface tasks without requiring any kind of touch input from the user.

The user interface application may rely on properties of the curve of the screen to provide a capability of selecting a portion of the screen. For example, the user interface application may select a portion of the screen centered around a vertex point of the curvature of the flexible screen. The size of the selected portion may also depend on how sharp the curve is. For example, the user interface application may select a portion of screen that is inversely proportional to the degree of curvature. That is, a sharp curve may result in a selection of narrow portion of the screen, while a shallow curve may result in a selection of a broad portion of the screen. In some embodiments, the user interface application highlights the selected portion. For example, a color of the selected portion may be changed. In another example, an outline may be drawn around the selected portion.

In one embodiment, the user interface application determines that an object is being displayed at the vertex point of the curvature. The user interface application may adjust the selected region based on a size of the object. For example, if the selected portion of the screen would otherwise exclude some parts of the objects, user interface application may adjust the selected portion of the screen to encompass the entirety of the object.

Once the portion of the screen is selected, the user interface application may display a menu of contextual actions relevant to the selected area. For example, a menu may be displayed offering options to: take a screenshot of the selected area, to apply a filter to the selected area, or to delete an image in the selected area. In response to a user selection of an action, the user interface application performs the contextual action.

The user interface application may cancel the selection of the portion of the display. For example, if the degree of the curvature drops below a threshold (e.g., due to the user no longer bending the screen), the user interface application may unselect the portion of the display. The user interface application may also remove the highlighting once the unselecting occurs. In some embodiments, if curvature of the screen changes, the user interface application changes the selected portion of the screen based on the new properties of the curvature.

In one embodiment, to accomplish a selection of a moving object, the user may bend the flexible screen such that the vortex of the bend tracks the moving object. The user interface application may identify that an object is generated for display at a first vertex point of the flexible screen. Then, at later time, the user interface application identifies the same object being generated for display at a second vertex point of the flexible screen different from the first vertex point. As a result, the user interface application selects that object. In some embodiments, the user interface application also highlights the selected object. For example, the user interface application may change the color of the selected object. In some embodiments, the object is selected only when the distance between the first vertex point and the second vertex points is less than a threshold distance. The threshold distance may depend on the size of the object. This may be done to prevent selection of an object that is not intended by the user. Sometimes more than one object may be present at a position of the first vertex point. In this case, the user interface application may select the object that is the most prominent.

Once the object of the screen is selected, user interface application may display a menu of contextual actions relevant to the selected object. For example, a menu may be displayed offering options: to copy the object, to apply a filter to the selected object, or to delete the object. In response to a user selection of an action, the user interface application performs the contextual action.

In some embodiments, the electronic device includes motors or actuators capable of bending the display. In this case, once the object is selected, the user interface application may continue to bend the screen (without further effort from the user) such that the vertex of curvature corresponds to the location of the moving object on the display after the object moves past the second vertex point.

The user interface application may rely on properties of the curvature of the screen to control a presentation of a media asset on the screen. For example, the user interface application may rewind or fast-forward the media asset based on the curvature of the flexible screen. For example, if the screen is bent by the user into the top plane of the display, the user interface application fast-forwards the media asset. In another example, if the screen is bent by the user out of the top plane of the display, the user interface application rewinds the media asset. In another example, a vertical bend results in a fast-forward, while a horizontal bend results in a rewind.

In some embodiments, the user interface application also controls the speed of the presentation of the media asset based on the degree of curvature of the screen. For example, sharper bends may result in faster rewinds or fast-forwards, while shallowed bends may result in slower rewinds or fast-forwards. The user interface application may also adjust the speed of the rewind based on the genre. For example, the same curvature may result in different speeds for action scenes and for romantic scenes. In an additional embodiment, the user interface application may pause the media asset when it detects curvature of the screen rapidly changing in and out. In another additional embodiment, the user interface application may skip a scene of a media asset when it detects a screen being rapidly bent and unbent in the same direction.

The user interface may also control the presentation position of the media asset based on the location of the vertex point of the curvature. For example, the user may bend the screen such that the vertex of the curvature is centered over a desired presentation position of the media asset (e.g., as shown by a control bar). The user interface application may then present the media asset from the desired presentation position.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 shows an illustrative flowchart for adjusting the selected region of a display, in accordance with some embodiments of the disclosure;

DETAILED DESCRIPTION

Figure 1:
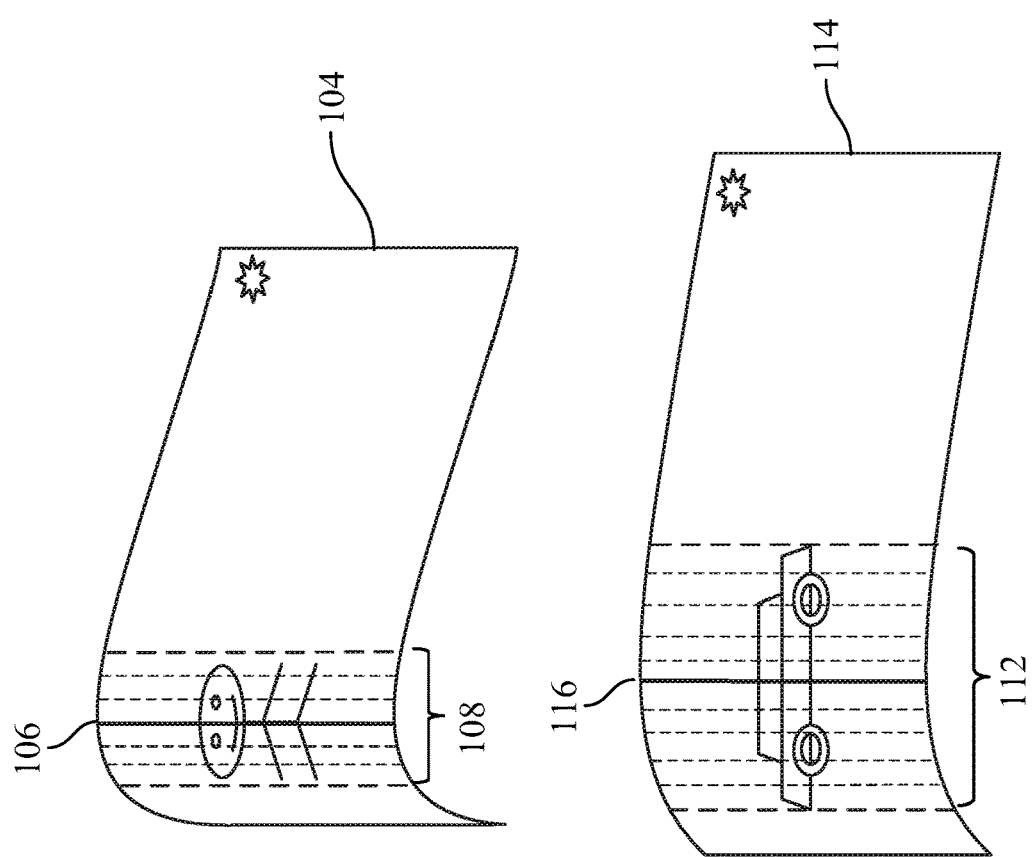
FIG. 1 shows an illustrative example of a selection of a region of a flexible screen based on a degree of curvature of a flexible screen, in accordance with some embodiments of the disclosure.
Figure 1:
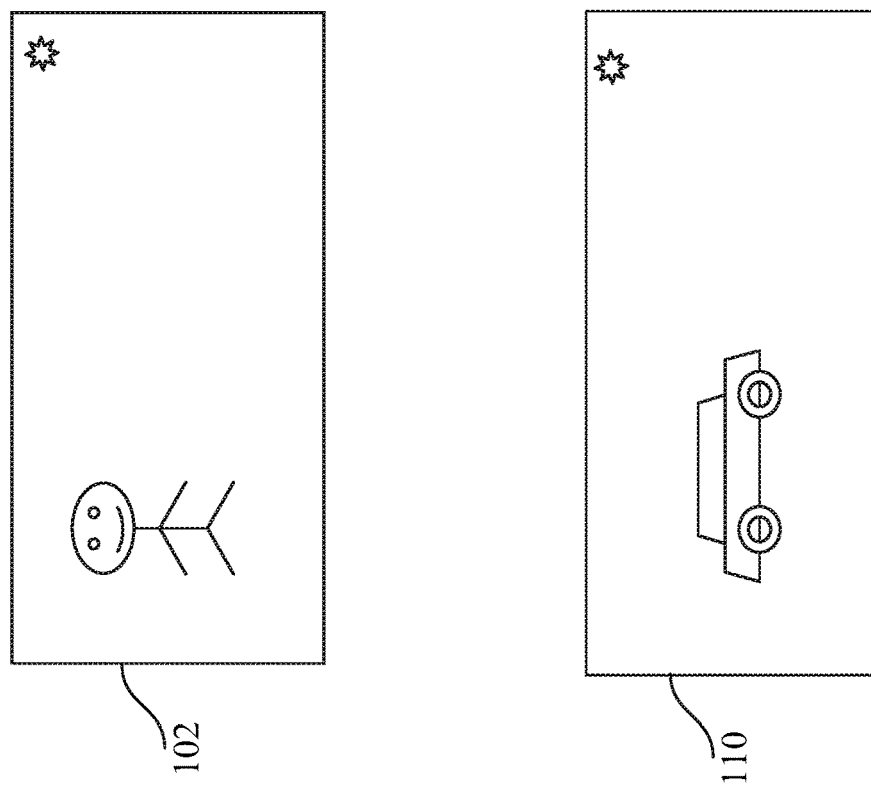

FIG. 1 shows an illustrative example 100 of a selection of a region of a flexible screen based on a degree of curvature of a flexible screen. In some embodiments, the steps described in this example are performed by a user interface application. The user interface application may be executing on an electronic device (e.g., smartphone of the user) that includes flexible screen.

In example 100, a user may bend the flexible screen of an electronic device to accomplish a selection of a certain portion of the screen. The user may bend the screen a certain way to select a portion of screen 102 containing an image of a person. In another example, the user may bend the screen a certain way to select a portion of screen 110 containing an image of a car. The user interface application may select a portion of the flexible screen based on the detected vertex point of curvature of the flexible screen and based on the degree of curvature of the flexible screen. The vertex point and degree of curvature may be determined using an array of strain sensors. An exemplary description of this determination is provided below in connection with FIG. 6.

The user may deform screen 102 to create a sharp bend, such that screen 102 becomes a curved screen 104. The user interface application determines that screen 104 includes a vertex point 106. For example, the user interface application may determine that screen 104 is bent the most at point 106 and designate that location as a vertex point. The user interface application may also determine the degree of curvature of screen 104. For example, the user interface application may calculate the radius of the curve of screen 104. In example 100, the radius of curve of the screen 104 is low (e.g., 1.5 inches), which may correspond to a high degree of curvature. The user interface application may then select area 106 of screen 104 that is inversely proportional in size to the degree of curvature. For example, the length of area 108 may be ½ of the radius of the curve. In this example, the user interface application may select area 106 (e.g., an area that has a length of 0.75 inches). Once area 106 is selected, it may be highlighted.

The user may deform screen 110 to create a shallow bend, such that screen 110 becomes a curved screen 114. The user interface application determines that screen 114 includes a vertex point 116. For example, the user interface application may determine that screen 104 is bent the most at point 116 and designate that location as a vertex point. The user interface application may also determine the degree of curvature of screen 114. For example, the user interface application may calculate the radius of the curve of screen 114. In example 100, the radius of the curve of the screen 104 is high (e.g., 4 inches), which may correspond to a low degree of curvature. The user interface application may then select area 116 of screen 114 that is inversely proportional to the degree of curvature. For example, the length of the area 116 may be ½ of the radius of the curve. In this example, the user interface application may select area 116 (e.g., an area that has length of 2 inches). Once area 112 is selected, it may be highlighted.

Once area 108 or area 112 is selected, it may be further adjusted based on presence (or partial presence) of objects in the respective area. For example, the user interface application may automatically adjust area 108 to fully contain an image of a person as shown in FIG. 1. In another example, the user interface application may automatically adjust area 108 to fully contain an image of a car as shown in FIG. 1. In some embodiments, instead of (or in addition to) adjusting the area, the user interface application highlights the relevant object. For example, the user interface application may determine that area 108 contains an image of a person and may further highlight that image. In another example, the user interface application may determine that area 112 contains an image of a car and may further highlight that image.

In some embodiments, the user interface application performs an action related to the selected area (e.g., area 108 or area 112) or to an object in that area. For example, the user interface application may automatically filter or crop the selected area or the object. The user interface application may also generate for display a menu of contextual actions (e.g., overlaid over area 108 or 112) related to the area or to the object. For example, the user interface application may display a menu allowing a user to: take a screenshot of the selected area, to apply a filter to the selected are, or to delete an object from the selected area. A user may select the action, resulting in the action being performed by the user interface application.

The user interface application may deselect the area 108 or 112 after determining that the degree of curvature of the screen 104 or 114 has decreased below a certain threshold (for example, due to the user no longer deforming the screen). When the degree of curvature of the screen 104 or 114 falls below the threshold (e.g., when a radius of the curve becomes larger than 6 inches), the user interface application may deselect area 108 or area 112. For example, user interface application may remove highlight from the selected area.

The user interface may also change the selected area if the vertex point or the degree of the curvature of the flexible screen changes. For example, if vertex point 106 was determined at the first time, the user interface application may determine that a second vertex point is at a different part of screen at a different time. The user interface application may then select and highlight a new portion of screen 104 based on the second vertex point position and based on curvature of the flexible screen at the different time.

Figure 2:
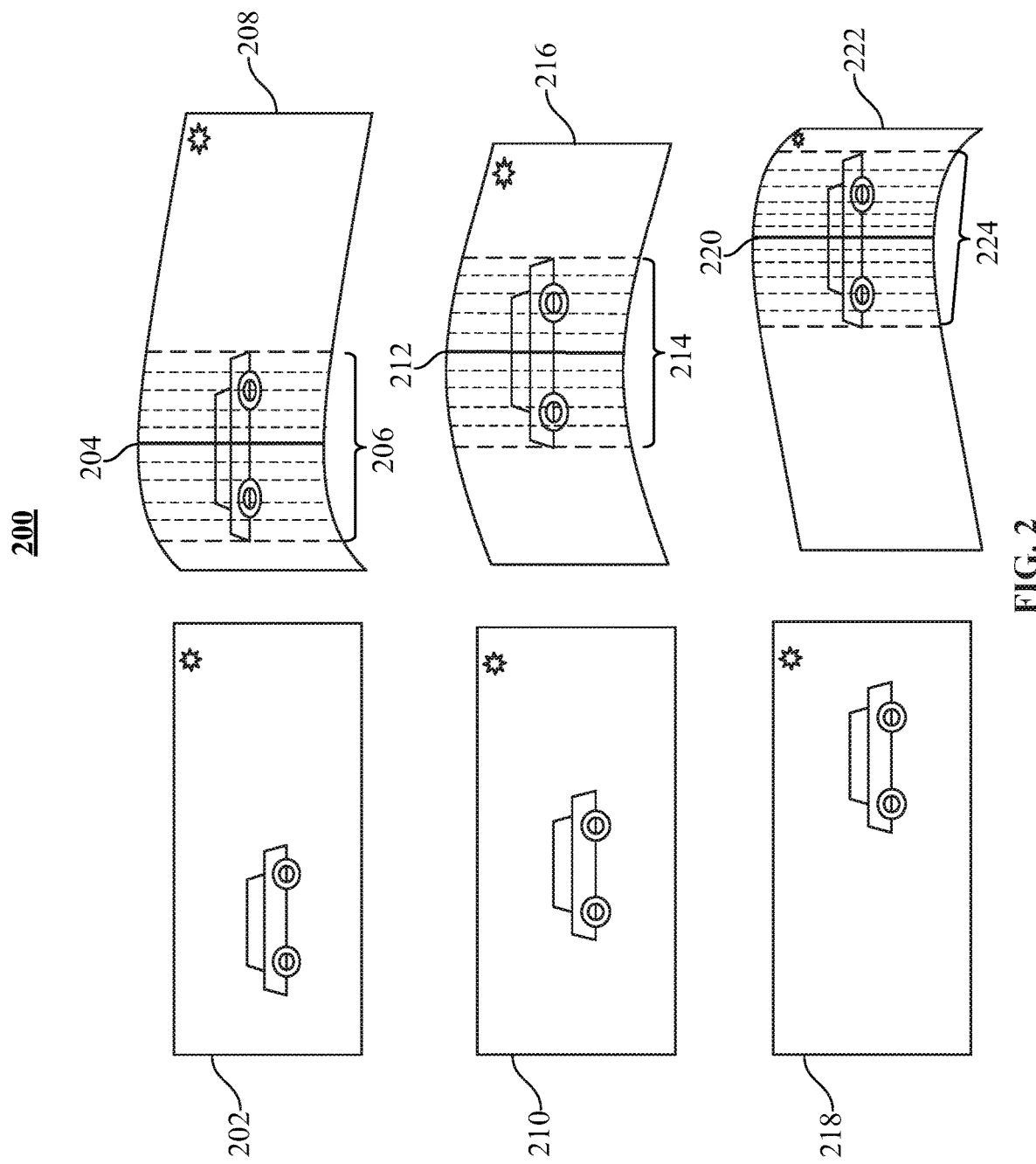
FIG. 2 shows an illustrative example of a selection of a moving object on a flexible screen, in accordance with some embodiments of the disclosure.

FIG. 2 shows an illustrative example 200 of a selection of a moving object on a flexible screen. In some embodiments, the steps described in this example are performed by a user interface application. The user interface application may be executing on an electronic device (e.g., smartphone of the user) that includes flexible screen.

In example 100, a user may bend the flexible screen of an electronic device to accomplish a selection of moving object on the flexible screen without a need to pause the media asset being presented on the screen. The user may bend the screen to track a position of a moving object (e.g., a car.) For example, when car is in a first position on a screen 202, at a first time, the user may bend the screen 208 such that vertex point 204 of the curve is positioned over the car. When the car is in a second position on screen 210, at a second time, the user may bend the screen 216 such that vertex point 212 of the curve is also positioned over the car.

At a first time, the user interface application determines a position of first vertex point 204 of screen 208. The user interface application may also identify that first vertex point 204 intersects an image of a car. At a second time, the user interface application determines a position of second vertex point 212 of screen 216. The user interface application may also identify that vertex point 212 still intersects an image of a car that has moved across the screen. In response, the user interface application selects the moving car. The user interface application may also highlight the selected object. The user interface application may also highlight the area of the screen that contains the car (e.g., portion 214).

In some embodiments, the user interface application accounts for user tracking of the moving object being imprecise. For example, vertex point 212 may be certain distance away from the car. The user interface application may compute the distance between the position of the car and the position of vertex point 212. The user interface application may also determine that the second position of the flexible screen corresponds to second vertex point 212 if the distance is below a calculated maximum distance. The calculated maximum distance may be inversely proportional to the size of the object. That is, more room for error may be given to a user trying to select a small moving object than to a user trying to a select a large moving object.

The user interface application may determine that multiple objects are presented at the position of first vertex point 204 (e.g., a car and person). In some embodiments, user interface application selects the object that is the most prominent (i.e., an object that has the most pixels).

In some embodiments, the user interface application performs an action related to the selected object. For example, the user interface application may automatically filter or crop the selected object. The user interface application may also generate for display a menu of contextual actions (e.g., overlaid over the car). For example, the user interface application may display a menu allowing a user to: take a screenshot of the selected object, to apply a filter to the selected object, or to delete the selected object. A user may select the action, resulting in the action being performed by the user interface application.

Electronic device 400 may include motors or actuators capable of bending the flexible screen without user action. In this case, once the object (e.g., the car) is selected, the user interface application may continue to bend the screen (without further effort from the user) such that the vertex of curvature corresponds to the location of the moving object on the display after the object moves past the second vertex point. For example, screen 218, at a third time, may display the car that was selected as shown on screen 216. The user interface application may automatically bend the flexible screen 222 using the motors or actuators such that vertex point 220 is still centered over the car. This may provide haptic feedback to the user letting the user know that the car is still selected.

Figure 3A:
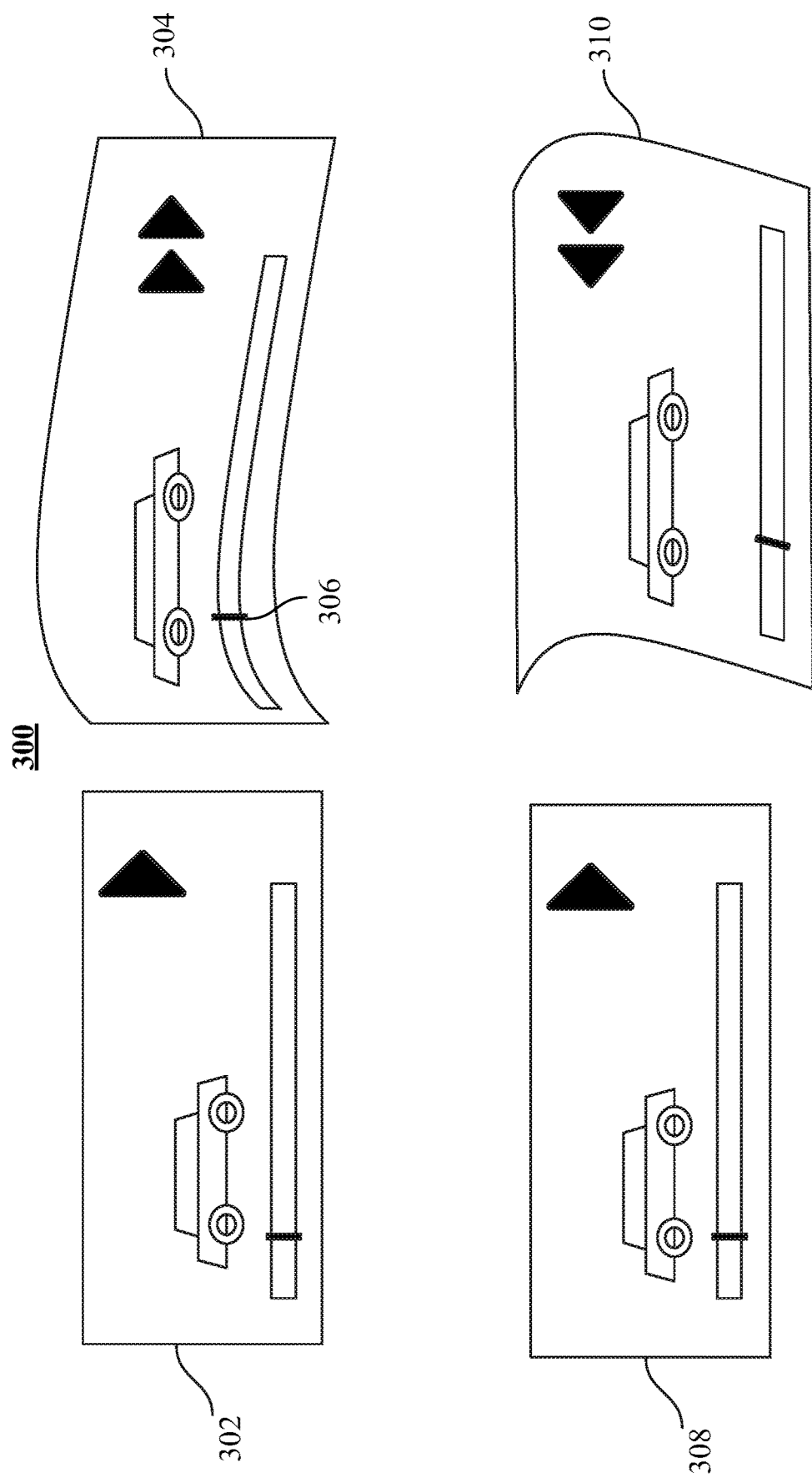
FIG. 3A shows an illustrative example of controlling presentation of a media asset based on a detected curvature of a flexible screen, in accordance with some embodiments of the disclosure.

FIG. 3A shows an illustrative example 300 of a controlling presentation of a media asset based on a detected curvature of a flexible screen. In some embodiments, the steps described in this example are performed by a user interface application. The user interface application may be executing on an electronic device (e.g., smartphone of the user) that includes flexible screen.

In example 300, a user may bend the flexible screen of an electronic device to control presentation of the media asset on the screen of an electronic device. In some embodiments, the user interface application may determine a direction of a curvature of the flexible screen and present the media asset on the flexible screen based on the selected media asset presentation direction.

For example, a media asset may be presented on screen 302 at regular speed. Then, the user interface application determines that screen 304 is bent out of the top plane of the flexible screen.

In response, the user interface application may begin fast-forwarding the media asset. In another embodiment, the user interface application determines that screen 304 is bent vertically. In response, the user interface application may begin fast-forwarding the media asset.

In another example, a media asset may be presented on screen 308 at regular speed. Then, the user interface application may determine that screen 310 is bent into the top plane of the flexible screen. In response, the user interface application may begin rewinding the media asset. In another embodiment, the user interface application determines that screen 310 is bent horizontally. In response, the user interface application may begin rewinding the media asset.

In some embodiments, the user interface application also uses the degree of curvature to control the speed of the presentation of the media asset. For example, the user interface application may determine that screen 304 has a shallow bend (e.g., the radius of the curve is larger than 5 inches). In this case the media asset may be presented at 2× speed. In another example, interface application may determine that screen 310 has a sharp bend (e.g., the radius of the curve is larger than 2 inches). In this case, the media asset may be presented at 4× speed. In some embodiments, the user interface application selects a presentation speed that is proportional to the degree of the curvature. That is, the harder the user bends the screen, the faster the media asset is presented by the user interface application.

In some embodiments, the user rapidly bends the display in and out of the top plane of the screen to pause the presentation of the media asset. When the user interface application detects direction of the curvature of the flexible screen being changed within a predetermined maximum time (e.g., 1 second), the user interface application may pause the presentation of the media asset. In some embodiments, the user may rapidly bend the display and return it to flat state to skip a portion of the media asset. In some embodiments, when the user interface application detects curvature of the flexible screen being created multiple times within a predetermined maximum time (e.g., 1 second), the user interface application skips though the current scene of the media asset.

In some embodiments, the user interface application selects a presentation position of the media asset based on the vertex point of the curvature of the screen. For example, the user interface application may detect that position 306 of the vertex point is positioned over a control bar displayed on the screen. In this case, the user interface application presents the media from the position corresponding to point 306 of the control bar.

Figure 3B:
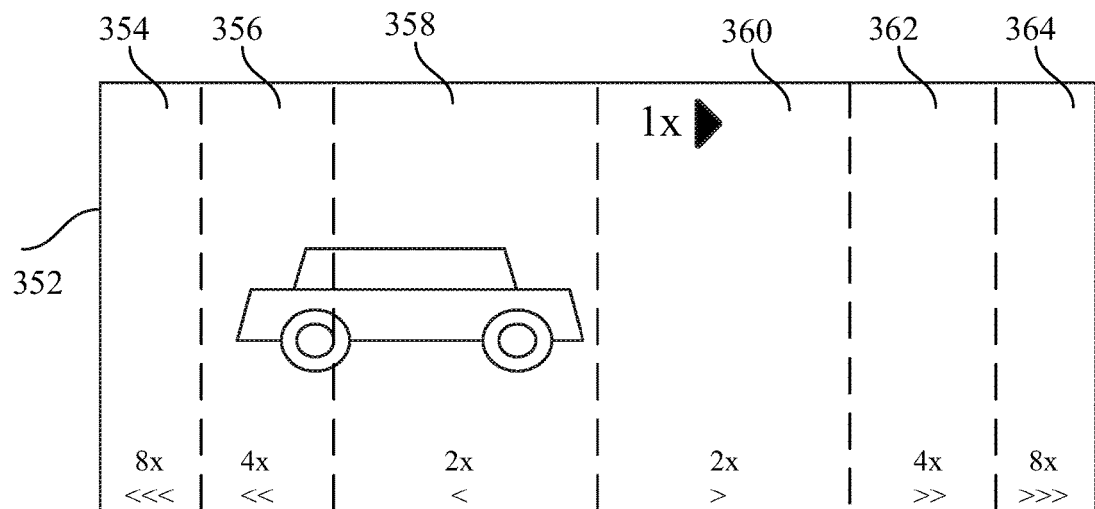
FIG. 3B shows another illustrative example of controlling presentation of a media asset based on a detected curvature of a flexible screen, in accordance with some embodiments of the disclosure.
Figure 3B:
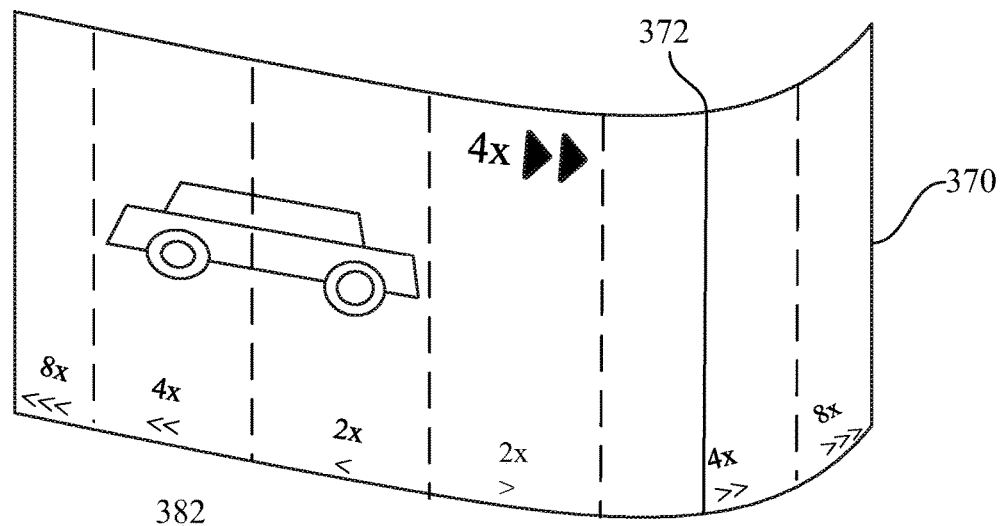
Figure 3B:
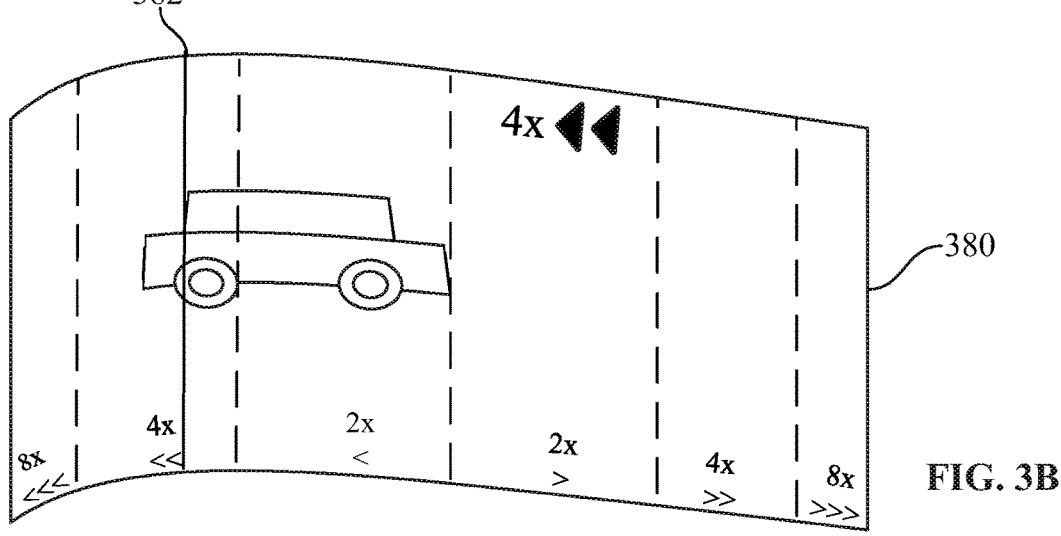

FIG. 3B shows another illustrative example 350 of controlling presentation of a media asset based on a detected curvature of a flexible screen. In some embodiments, the steps described in this example are performed by a user interface application. The user interface application may be executing on an electronic device (e.g., smartphone of the user) that includes flexible screen.

In example 350, a user may bend the flexible screen of an electronic device to control presentation of a media asset on a screen of an electronic device. In some embodiments, the flexible screen 352 is divided into several virtual sections, each section corresponding to its own presentation speed and presentation direction. For example, section 354 may correspond to rewinding at 8× speed, section 356 may correspond to rewinding at 4× speed, and section 358 may correspond to rewinding at 2× speed. Additionally, section 360 may correspond to fast forwarding at 2× speed, section 362 may correspond to fast forwarding at 4× speed, and section 364 may correspond to fast forwarding at 8× speed. In some embodiments, sections 354-364 are invisible to the user. In some embodiments, sections 354-364 are shown to the user upon request. For example, sections 354-364 may be shown to the user as divided by dashed lines in response to a user pressing a "help" icon. In some embodiments, when the screen is not bent, the user interface application presents the media content in a forward direction at 1× speed.

The user may bend the flexible screen such that the vertex point is formed in one of sections 354-364. The user interface application then selects presentation speed and direction based on the location of the vertex point. For example, user interface application may detect that flexible screen 370 includes vertex point 372 that is located in section 362. In response, the user interface application presents the media asset as being fast forwarded at 4× speed. In another example, user interface application detects that flexible screen 380 includes vertex point 382 that is located in section 356. In response, user interface application may present the media asset as being rewound at 4× speed.

The media asset may be an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same.

Electronic device 400 may be any device for accessing the content described above, such as a television, a Smart TV, a set-top box, an integrated receiver decoder (IRD) for handling satellite television, a digital storage device, a digital media receiver (DMR), a digital media adapter (DMA), a streaming electronic device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

Figure 4:
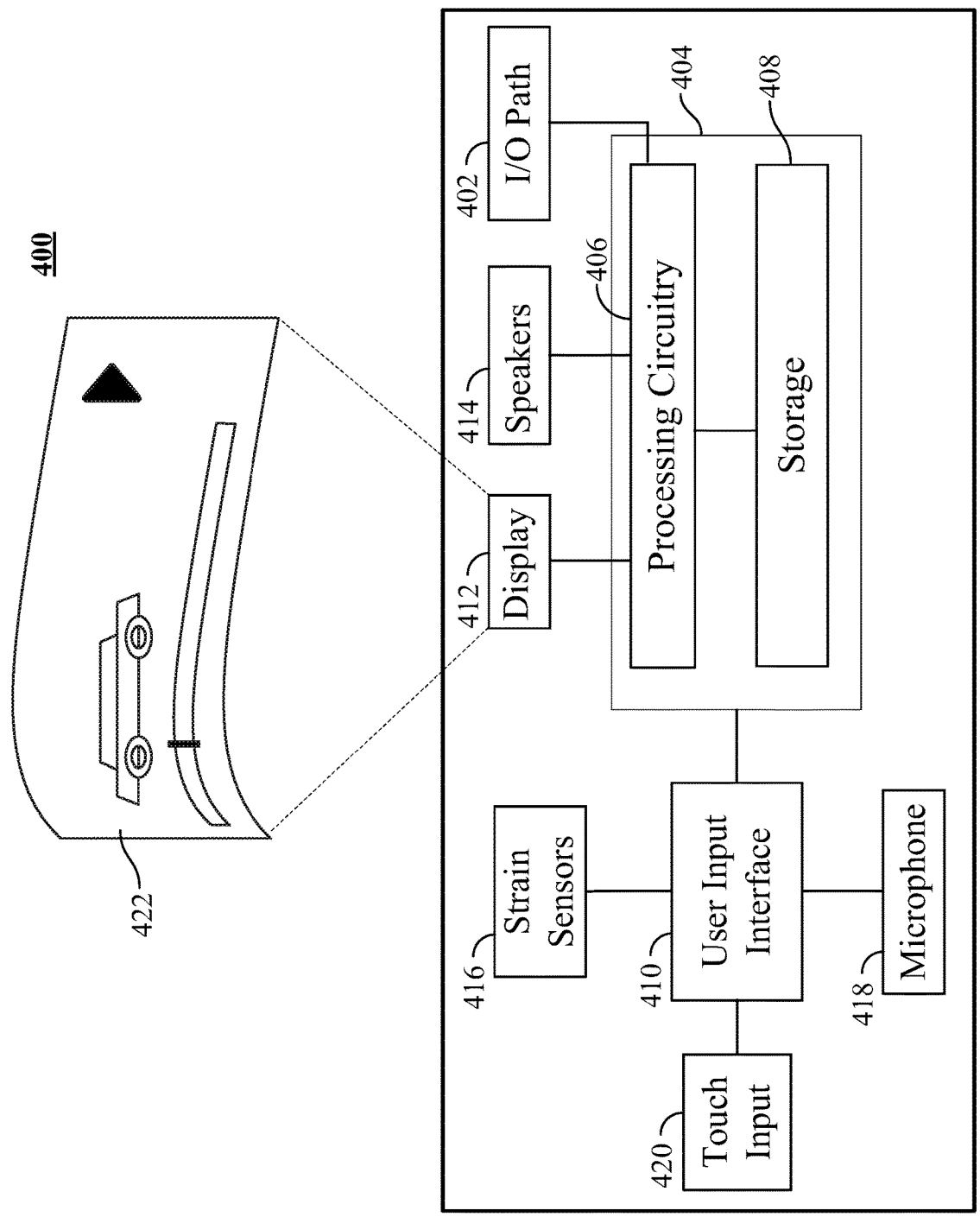
FIG. 4 shows an illustrative system for detecting user input on a flexible screen, in accordance with some embodiments of the disclosure.

FIG. 4 shows a generalized embodiment of illustrative electronic device 400. As depicted, electronic device 400 may be a smartphone or tablet. Electronic device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a user interface application stored in memory (i.e., storage 408). Specifically, control circuitry 404 may be instructed by the user interface application to perform the functions discussed above and below.

In client-server based embodiments, control circuitry 404 may include communications circuitry suitable for communicating with a user interface application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices, or communication of electronic devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage may be used to supplement storage 408 or instead of storage 408.

Control circuitry 404 may include tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the electronic device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from user equipment 400, the tuning and encoding circuitry (including multiple tuners) may be associated with storage 408.

A user may send instructions to control circuitry 404 using user input interface 410 of electronic device 400 or user touch input 420 of electronic device 400. User input interface 410 may be any suitable user interface, such as a remote control, mouse, trackball, keypad, keyboard, touch screen, touchpad, stylus input, joystick, voice recognition interface, or other user input interfaces. Display 412 may be a touchscreen or touch-sensitive display. In such circumstances, user input interface 410 may be integrated with or combined with flexible screen 422. Flexible screen 422 may be configured to be bent or otherwise deformed by the user. For example, flexible screen 422 may be bent into or out of the plane of the display 412. In some embodiments, flexible screen 422 may be bent horizontally or vertically. Flexible screen 422 may be bent at any point along the screen.

Speakers 414 may be provided as integrated with other elements of electronic device 400. In the case of electronic device 400, speakers 418 may be stand-alone units (e.g., smart speakers). The audio component of videos and other content displayed on display 412 may be played through speakers 418. In some embodiments, the audio may be distributed to a receiver (not shown), which processes and outputs the audio via speakers 418.

The user interface application may be implemented using any suitable architecture. For example, it may be a stand-alone application wholly implemented on electronic device 400. The user interface application and/or any instructions for performing any of the embodiments discussed herein may be encoded on computer readable media. Computer readable media includes any media capable of storing data. In some embodiments, the user interface application is a client server based application. Data for use by a thick or thin client implemented on electronic device 400 is retrieved on-demand by issuing requests to a server remote to the electronic device 400 or electronic device 400, respectively. For example, electronic device 400 may receive inputs from the user via input interface 410 and transmit those inputs to the remote server for processing and generating the corresponding outputs. The generated output is then transmitted to electronic device 400 for presentation to the user. In some embodiments, input interface 410 may include strain sensors 416. Strain sensors 416 may be arranged in a grid around flexible screen 422. Strain sensors 416 may detect strain values at different points of flexible screen 422. In some embodiments, control circuitry 406 is configured to analyze strain values provided by strain sensors 416 to determine properties of flexible screen 422. For example, control circuitry 406 may determine direction of the curvature, degree of curvature, and position of the vertex point of the curvature.

Figure 5:
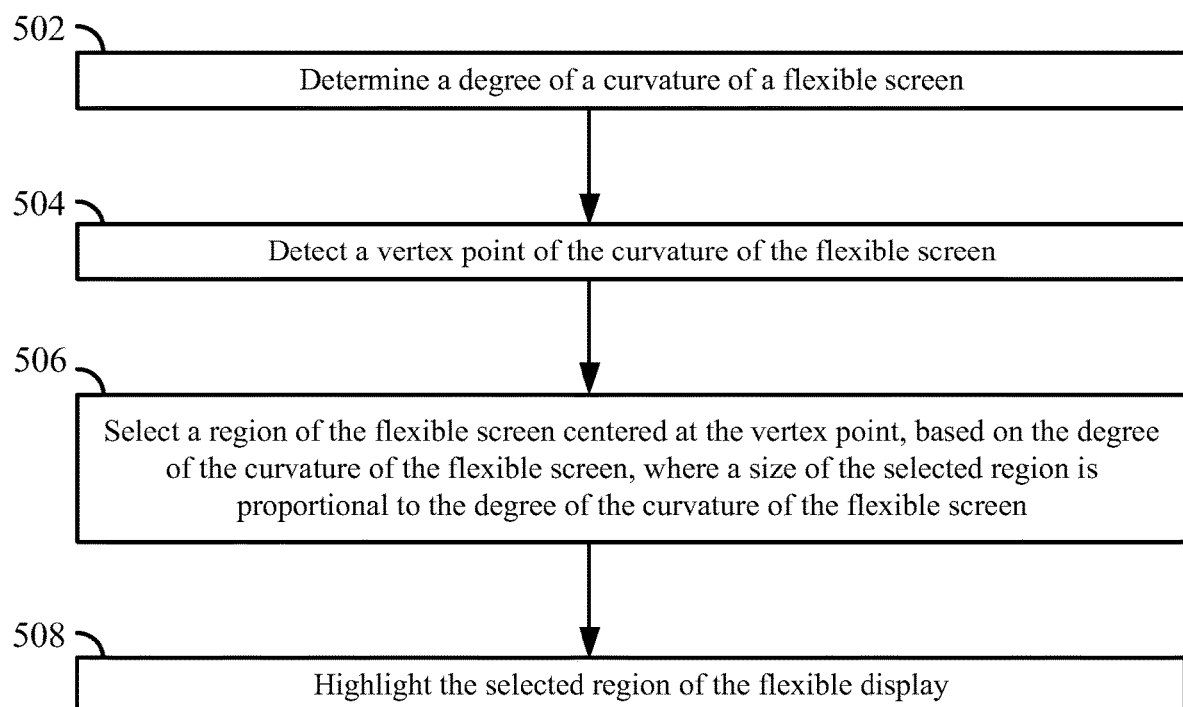
FIG. 5 shows an illustrative flowchart for selecting a region of a flexible screen based on a degree of curvature of the flexible screen, in accordance with some embodiments of the disclosure.

FIG. 5 is a flowchart of a detailed illustrative process 500 for selecting a region of a flexible screen based on a degree of curvature of the flexible screen. Process 500 may be executed by control circuitry 404 (e.g., in a manner instructed to control circuitry 404 by the user interface application). Control circuitry 404 may be a part of electronic device (e.g., electronic device 400).

At 502, control circuitry 404 determines a degree of a curvature of a flexible screen. Control circuitry 404 may determine the degree of curvature using strain sensors 416. For example, control circuitry 404 may determine that the radius of curvature of a flexible screen is 2 inches. At 504, control circuitry 404 may detect a vertex point of the curvature of the flexible screen. For example, control circuitry 404 may determine that position 106 of FIG. 1 is the vertex point of flexible screen 104. In some embodiments, the point with the highest strain measurements is the vertex point.

At 506, control circuitry 404 may select a region of the flexible screen centered at the vertex point, based on the degree of the curvature of the flexible display, where a size of the selected region is proportional to the degree of the curvature of the flexible screen. For example, control circuitry 404 may access a formula for computing the length of the region based on the degree of the curvature. In some embodiments, sharper curves results in a smaller area being selected, while a shallow curve results in a larger region being selected. In some embodiments, the lengths of the selected region may be ½ or ¾ of the radius of the curvature of the flexible display. Any other formula may also be used.

At 508, control circuitry 404 may highlight the selected region. For example, control circuitry 404 may adjust the color of the selected region (e.g., by tinting it with yellow color.) In another embodiment, control circuitry 404 draws an outline (e.g., a red box) around the selected region.

Figure 6:
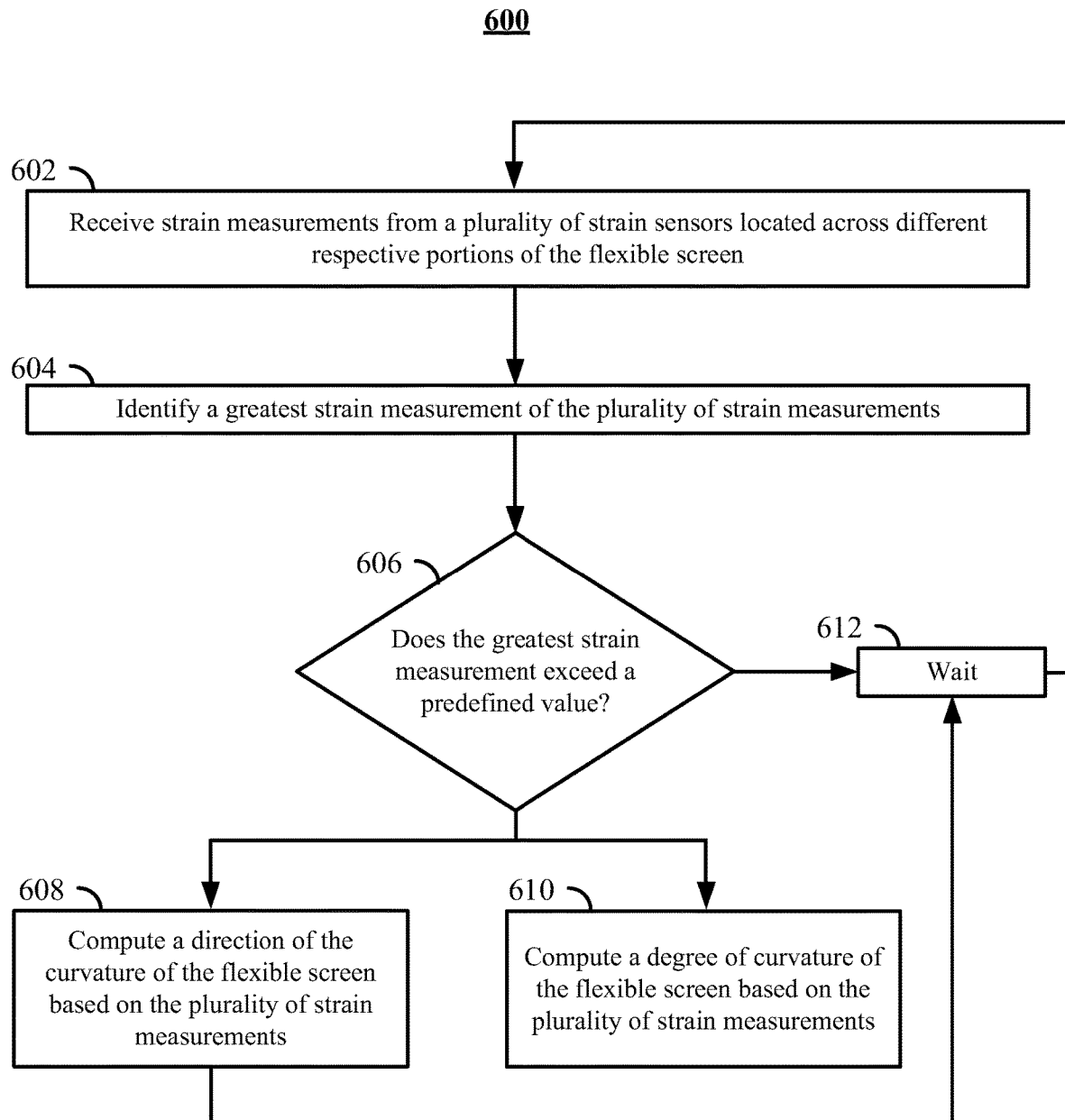
FIG. 6 shows an illustrative flowchart for identifying a degree of curvature of a flexible screen based on a plurality of strain measurements across the flexible screen, in accordance with some embodiments of the disclosure.

FIG. 6 is a flowchart of a detailed illustrative process 600 for identifying a degree of curvature of a flexible screen based on a plurality of strain measurements across the flexible screen. Process 600 may be executed by control circuitry 404 (e.g., in a manner instructed to control circuitry 404 by the user interface application). Control circuitry 404 may be a part of an electronic device (e.g., electronic device 400).

At 602, control circuitry 404 may receive strain measurements from a plurality of strain sensors (e.g., sensors 416) located across different respective portions of the flexible screen. In some embodiments, a table of strain measurements is provided with a strain measurement provided for each corresponding pixel of the flexible screen. An exemplary table (Table 1) is provided below showing exemplary strain measurements for a screen with 20 pixels. One skilled in the art would understand that similar tables may be used for screens with any number of pixels. In this embodiment, strain is measured as a percentage of a maximum possible strain.

TABLE 1

| | Column 1 | Column 2 | Column 3 | Column 4 | Column 5 |
|---|---|---|---|---|---|
| Row 1 | 50% | 70% | 50% | 20% | 0% |
| Row 2 | 50% | 70% | 50% | 20% | 0% |
| Row 3 | 50% | 70% | 50% | 20% | 0% |
| Row 4 | 50% | 70% | 50% | 20% | 0% |

At 604, control circuitry 404 may identify a greatest strain measurement of the plurality of strain measurements. For example, using Table 1, control circuitry 404 may determine that column 2 has the highest strain measurement. At 606, control circuitry 404 may check whether the greatest strain measurement exceeds a predefined value (e.g., 5%). This may be done because low amount of strain may naturally occur even without a user action. If the greatest strain measurement exceeds a predefined value, process 600 may proceed to steps 608 and 610; otherwise process 600 proceeds to step 612. At 612, process 600 may timeout for a short period of time (e.g., 1 second) and continue analyzing strain measurements at 602.

At 618, control circuitry 404 may compute a direction of the curvature of the flexible screen based on the plurality of strain measurements (e.g., based on Table 1). For example, positive values (as seen in Table 1) may be indicative of curvature being directed out of the plane of the screen.

Negative values (e.g., as showing in Table 2 below), may be indicative of curvature being directed into the plane of the screen.

TABLE 2

|       | Column 1 | Column 2 | Column 3 | Column 4 | Column 5 |
|-------|----------|----------|----------|----------|----------|
| Row 1 | −5%      | −5%      | −5%      | −5%      | −5%      |
| Row 2 | −30%     | −30%     | −30%     | −30%     | −30%     |
| Row 3 | −60%     | −60%     | −60%     | −60%     | −60%     |
| Row 4 | −30%     | −30%     | −30%     | −30%     | −30%     |

Additionally, control circuitry 404 may detect whether the screen is bent horizontally or vertically. For example, Table 1 may be indicative of a horizontal bend because strain values change across columns, but not rows. In another example, Table 2 may be indicative of a vertical bend because strain values change across rows, but not columns.

At 610, control circuitry 404 may compute a degree of curvature of the flexible screen based on the plurality of strain measurements. For example, control circuitry 404 may use values from Table 1 to perform a circular fit and determine a radius of a circle that would most closely match the values of, for example, Row 1 of Table 1. For example, control circuitry 404 may determine that a circle with a radius of 2 inches matches the values of Row 1 of Table 1 the best. The degree of the curvature is then determined based on the radius.

Figure 7:
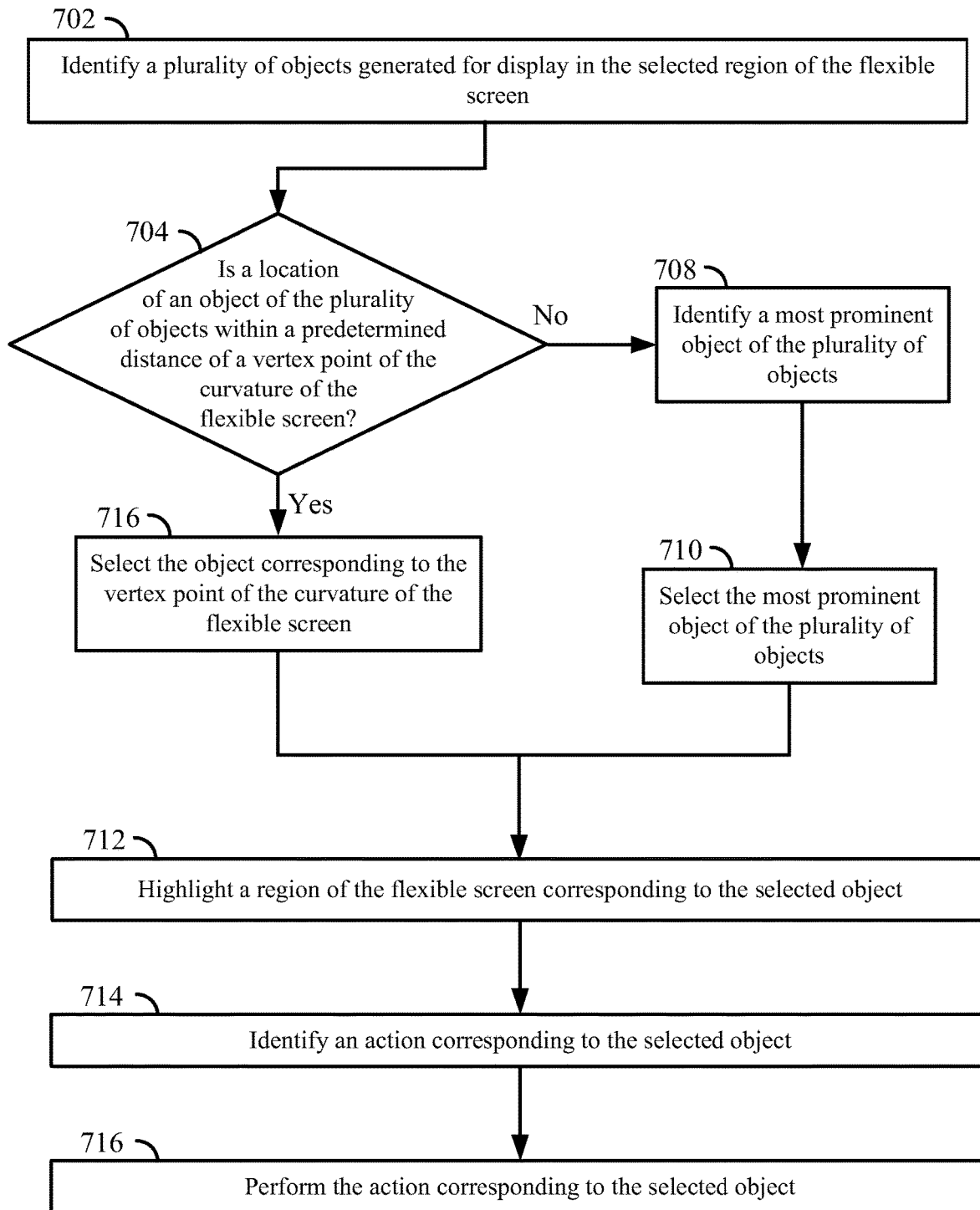
FIG. 7 shows an illustrative flowchart for selecting a region of the flexible screen including an object displayed on the flexible screen, in accordance with some embodiments of the disclosure.

FIG. 7 is a flowchart of a detailed illustrative process 700 for selecting a region of the flexible display including an object displayed on the flexible screen. Process 700 may be executed by control circuitry 404 (e.g., in a manner instructed to control circuitry 404 by the user interface application). Control circuitry 404 may be a part of an electronic device (e.g., electronic device 400).

At 702, control circuitry 404 may identify a plurality of objects generated for display in the selected region of the flexible screen (e.g., region 106 of region 116 of FIG. 1). For example, control circuitry 404 may access metadata of objects currently being displayed, and determine that the locations of some objects match the selected region of the flexible screen.

At 704, control circuitry 404 may check (for each object) whether location of an object of the plurality of objects is within a predetermined distance (e.g., 0.1 inches) of a vertex point of the curvature of the flexible screen. If so, process 700 may proceed to 716, where control circuitry 404 may select the object corresponding to the vertex point of the curvature of the flexible screen. Otherwise, control circuitry 404 may proceed to step 708. At 708, control circuitry 404 may identify a most prominent object of the plurality of objects. For example, the object with most pixels may be identified as most prominent. Then, at 710, control circuitry 404 may select the most prominent object.

At 712, control circuitry 404 may highlight a region of the flexible screen corresponding to the selected object. For example, control circuitry 404 may change the color of pixels of the relevant region of the flexible screen. In another example, control circuitry 404 may draw an outline around the relevant region of the flexible screen.

At 714, control circuitry 404 may identify an action corresponding to the selected object. For example, control circuitry 404 may display a menu on screen 422 (e.g., overlaid over the selected object). For example, a menu may include options to take a screenshot of the selected object, to apply a filter to the selected object, or to delete the selected object. At 716, in response to user selection of an action, control circuitry 404 performs the selected action. For example, control circuitry 404 may apply a filter to the selected object or delete the selected object.

Figure 8:
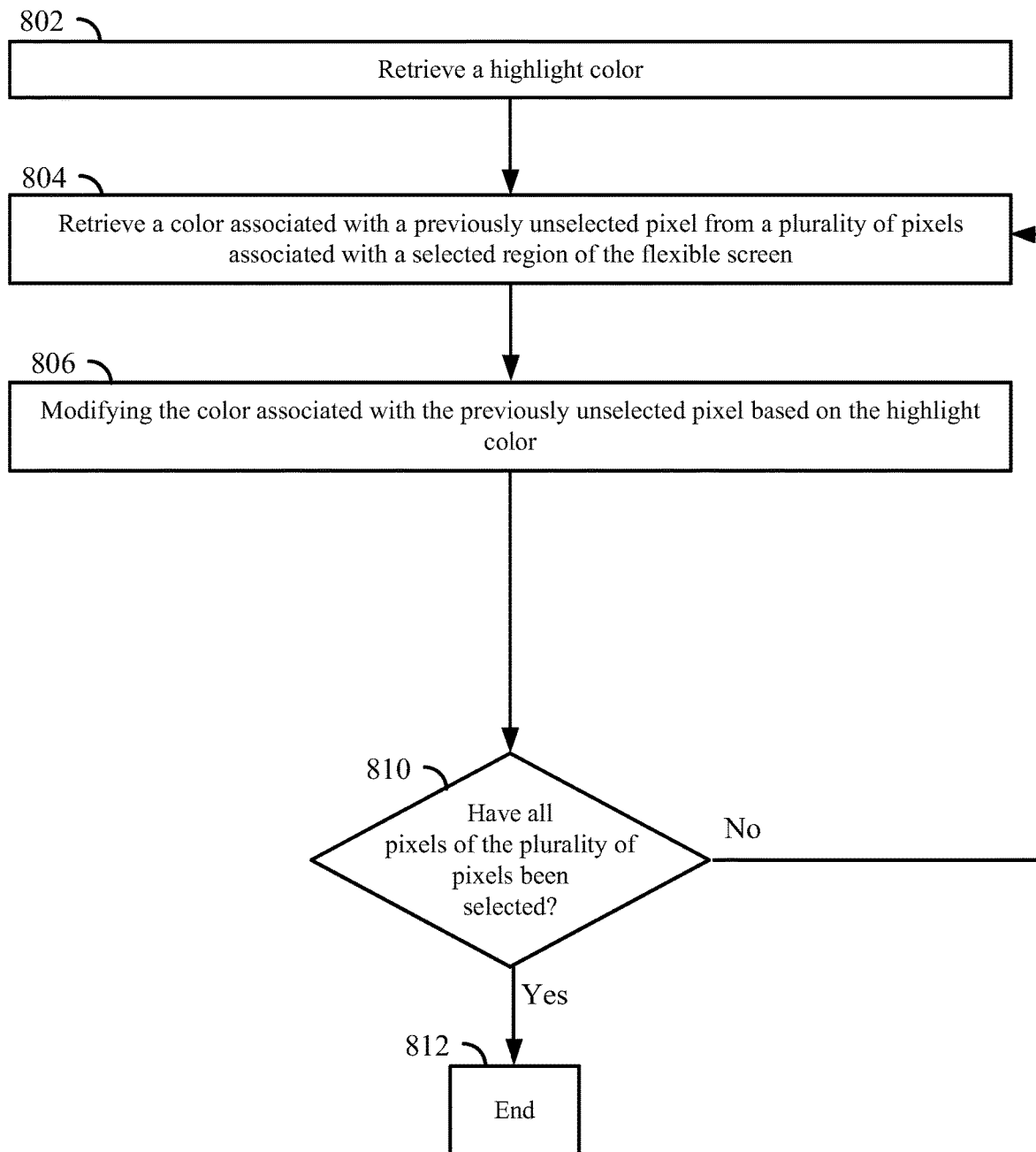
FIG. 8 shows an illustrative flowchart for highlighting a region of the flexible screen, in accordance with some embodiments of the disclosure.

FIG. 8 is a flowchart of a detailed illustrative process 800 for highlighting a region of the flexible screen. Process 800 may be executed by control circuitry 404 (e.g., in a manner instructed to control circuitry 404 by the user interface application). Control circuitry 404 may be a part of an electronic device (e.g., electronic device 400).

At 802, control circuitry 404 may retrieve a highlight color (e.g., yellow or green). In some embodiments, the color is selected by a user. At 804, control circuitry 404 retrieves a color associated with a previously unselected pixel from a plurality of pixels associated with a selected region of the flexible screen. For example, control circuitry 404 may start by retrieving the color of the topmost, leftmost pixel. At 806, control circuitry 404 modifies the color associated with the previously unselected pixel (chosen at 804) based on the highlight color. For example, the retrieved color may be mixed with the highlight color. At 810, control circuitry 404 checks if pixels in the selected region have been processed. If not, the process may continue at 804, until all pixels have been processed. Once that happens, process 800 proceeds to the end at step 812.

FIG. 9 is a flowchart of a detailed illustrative process 900 for adjusting the selected region of a display. Process 900 may be executed by control circuitry 404 (e.g., in a manner instructed to control circuitry 404 by the user interface application). Control circuitry 404 may be a part of an electronic device (e.g., electronic device 400).

At 902, control circuitry 404 may identify an object generated for display in the selected region (e.g., selected as part of step 506 of FIG. 5) of the flexible screen. For example, control circuitry 404 may access metadata of the object and determine that at least some pixels of the object intersect the selected region. In some embodiments, control circuitry 404 identifies the object only if more than a threshold (e.g., 75%) number of pixels of the object are inside the selected region. At 904, control circuitry 404 may determine the dimensions of the object. For example, control circuitry 404 may determine the furthest extent of pixels of the object.

At 906, control circuitry 404 may check whether portions of the object are outside of the selected region. For example, control circuitry 404 may determine whether any pixels of the object are outside the selected region. If no such pixels are found, process 900 may end at 908. Otherwise, process 900 continues at 910.

At 910, control circuitry 404 may adjust the size of the selected region to match the dimensions of the object. For example, control circuitry 404 may enlarge the selected region such that all pixels of the objects are within the region.

Figure 10:
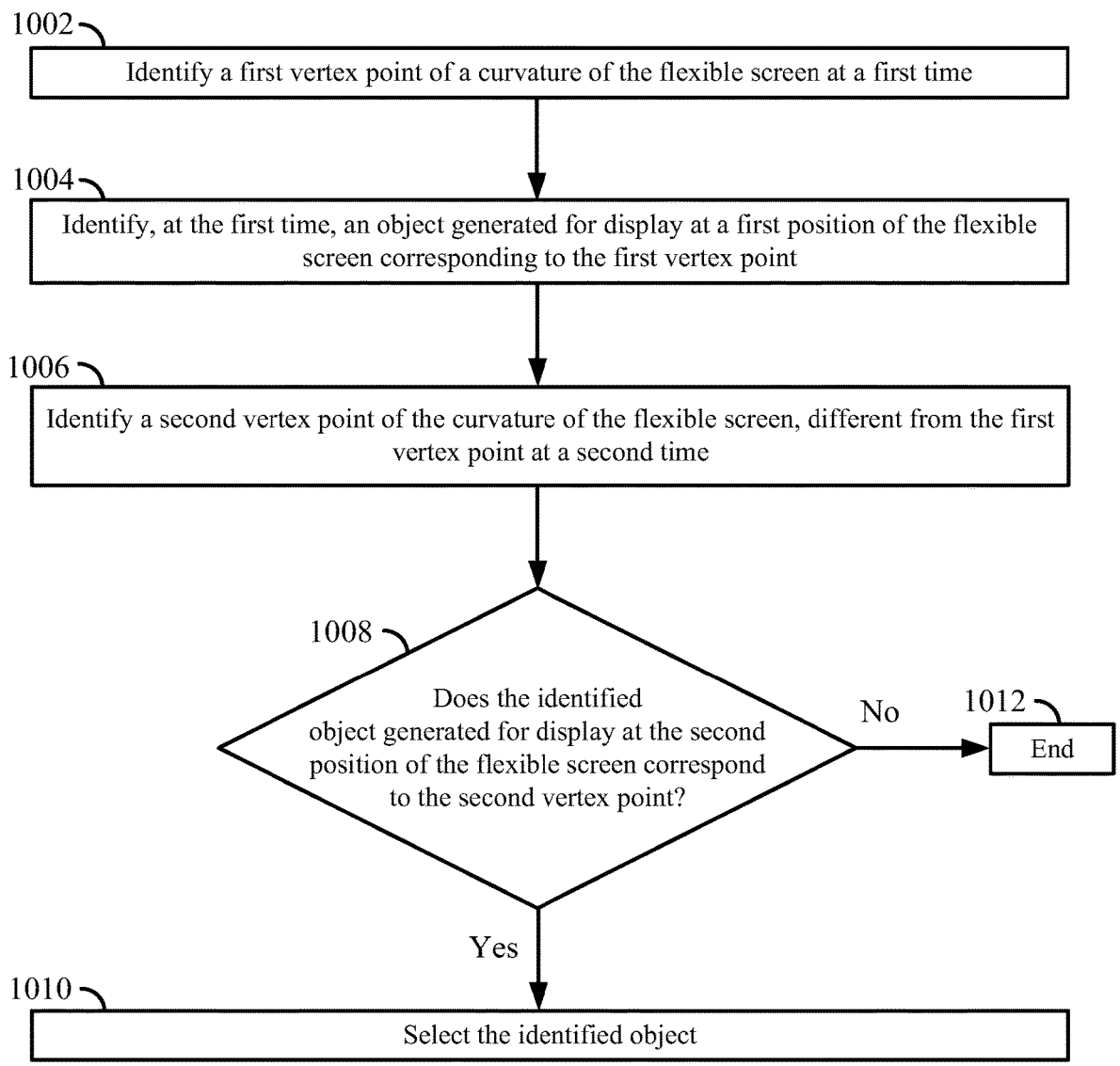
FIG. 10 shows an illustrative flowchart for selecting a moving object, in accordance with some embodiments of the disclosure.

FIG. 10 is a flowchart of a detailed illustrative process 1000 for selecting a moving object on a flexible display. Process 1000 may be executed by control circuitry 404 (e.g., in a manner instructed to control circuitry 404 by the user interface application). Control circuitry 404 may be a part of an electronic device (e.g., electronic device 400).

At 1002, control circuitry 404 may identify a first vertex point of a curvature of the flexible screen at a first time. For example, control circuitry 404 may identify vertex 204 of FIG. 2 at a time associated with a time stamp 0:00. At 1004, control circuitry 404 may identify, at the first time (e.g., time 0:00), an object generated for display at a first position of the flexible screen corresponding to the first vertex point. For example, the car of FIG. 2 may be detected to be located at vertex 204.

At 1004, control circuitry 404 may identify a second vertex point of a curvature of the flexible screen at a second time. For example, control circuitry 404 may identify vertex 212 of FIG. 2 at a second (e.g., time associated with a time stamp 0:02). At 1008, control circuitry 404 may check whether the identified object (e.g., the object identified at step 1004) is generated for display at the second position of the flexible screen that corresponds to the second vertex point. If not, process 1000 may end at 1012. Otherwise, process 1000 may continue at 1010.

At 1010, control circuitry 404 may select the identified object (e.g., due to detecting that the user is bending the screen to track the moving object). In some embodiments, control circuitry 404 also highlights a region associated with the object (e.g., as described in FIG. 8). In some embodiments, control circuitry 404 may perform an action associated with the object (e.g., as described in steps 714-716.)

Figure 11:
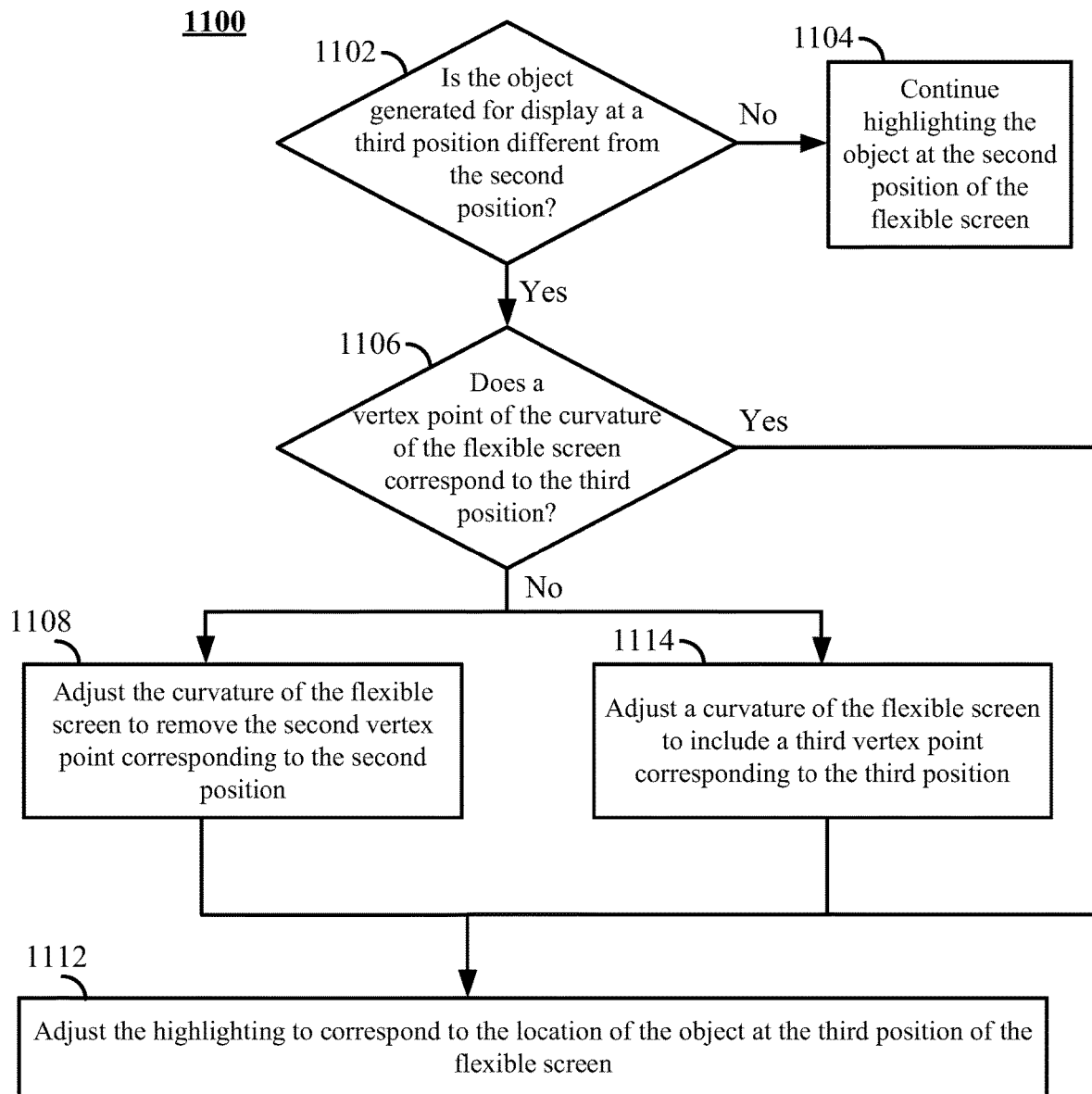
FIG. 11 shows an illustrative flowchart for automatically adjusting curvature of a flexible screen, in accordance with some embodiments of the disclosure.

FIG. 11 is a flowchart of a detailed illustrative process 1100 for automatically adjusting curvature of a flexible screen. Process 1100 may be executed by control circuitry 404 (e.g., in a manner instructed to control circuitry 404 by the user interface application). Control circuitry 404 may be a part of an electronic device (e.g., electronic device 400). In some embodiments, process 1100 is performed immediately after process 1000.

At 1102, control circuitry 404 may check whether the selected object (e.g., the object selected at step 1010) is generated for display at a third position different from the second position (e.g., the position identified at step 1008) at a third time (e.g., at time 0:04). If the position of the object has not changed, process 1102 proceeds to 1104, where control circuitry 404 continues highlighting the object at the second position of the flexible screen. Otherwise, process 1100 proceeds to step 1106.

At 1106, control circuitry 404 may check whether a vertex point of the curvature of the flexible display corresponds to the third position. If so, control circuitry 404 proceeds to 1112. Otherwise, process 1100 proceeds to 1108 and 1104.

At 1108, control circuitry 404 may adjust the curvature of the flexible screen to remove the second vertex point corresponding to the second position. For example, control circuitry 404 may actuate engines of the flexible screen 416 to flatten the flexible screen. At 1114, control circuitry 404 may adjust a curvature of the flexible screen to include a third vertex point corresponding to the third position. For example, control circuitry 404 may actuate engines of the flexible screen 416 to create a vertex at the third location. At 1112, control circuitry 404 may adjust the highlighting to correspond to the location of the object at the third position of the flexible screen.

Figure 12:
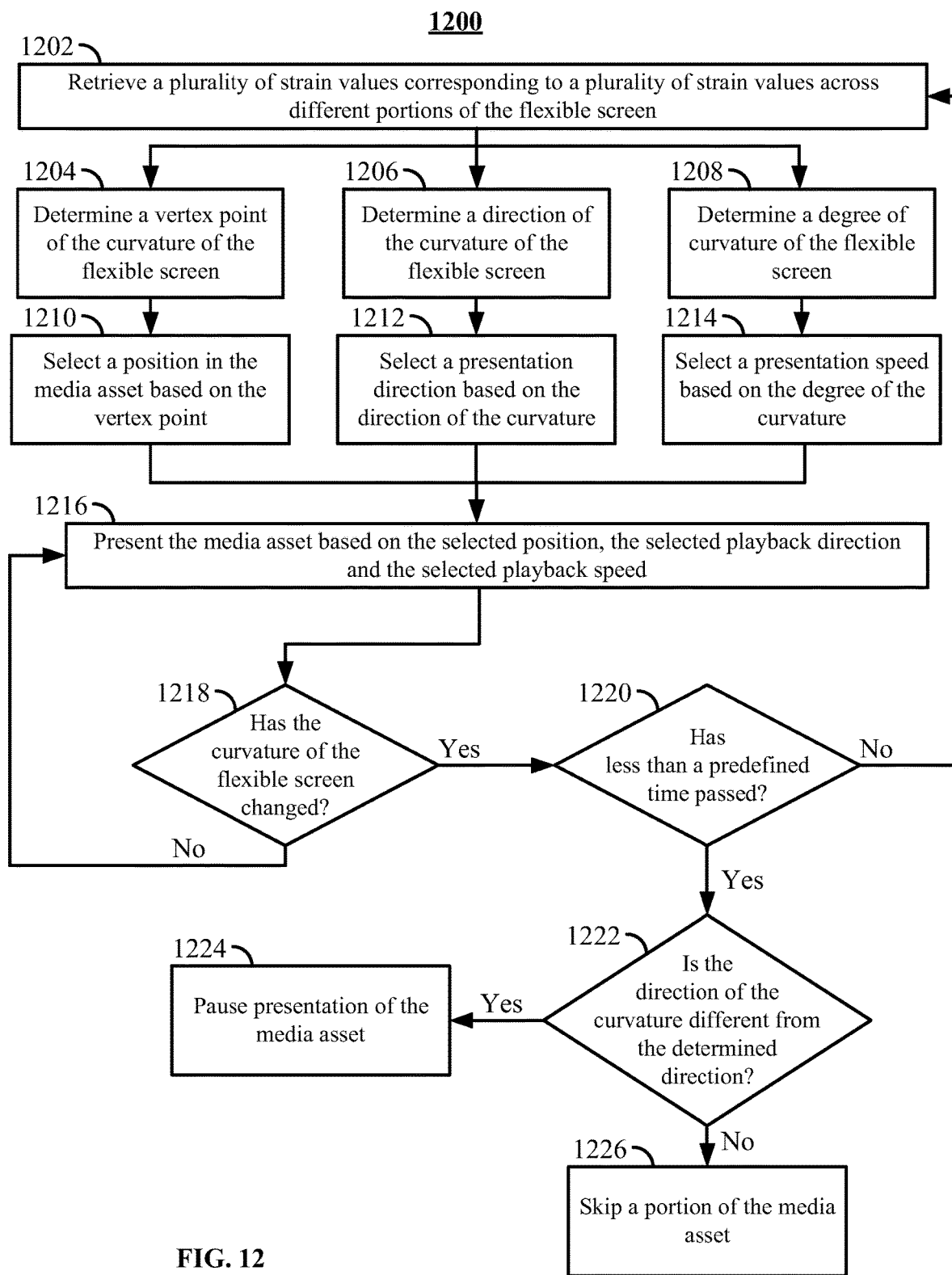
FIG. 12 shows an illustrative flowchart for selecting presentation direction and speed for a media asset, in accordance with some embodiments of the disclosure.

FIG. 12 is a flowchart of a detailed illustrative process 1200 for selecting presentation direction and speed for a media asset. Process 1200 may be executed by control circuitry 404 (e.g., in a manner instructed to control circuitry 404 by the user interface application). Control circuitry 404 may be a part of an electronic device (e.g., electronic device 400). In some embodiments, process 1200 is performed while the electronic device is presenting a media asset to a user (e.g., as shown in FIG. 3A)

At 1202, control circuitry 404 retrieves a plurality of strain values corresponding to a plurality of strain values across different portions of the flexible screen. For example, control circuitry 404 may retrieve a plurality of strain values from strain sensors 416 (e.g., as shown in Table 1). At 1204, control circuitry 404 may determine a vertex point of the curvature of the flexible screen based on the retrieved plurality of strain values. At 1206, control circuitry 404 may determine a direction of the curvature of the flexible screen based on the retrieved plurality of strain values. At 1208, control circuitry 404 may determine a degree of curvature of the flexible screen based on the retrieved plurality of strain values. In some embodiments, control circuitry 404 performs steps 1204, 1206, and 1208 as described in connection with FIG. 6 (e.g., by using Table 1 or Table 2).

At 1210, control circuitry 404 may select a position in the media asset based on the vertex point. For example, control circuitry 404 may determine that the vertex point is centered over a certain point of a control bar (e.g., as shown in FIG. 3A). The portion of the media asset that corresponds to the certain point of the control bar is selected as a presentation position. For example, point 306 of a control bar shown in FIG. 3A may correspond to a 10:30 presentation position of the media asset. In this case, control circuitry 404 may present the media asset starting from the 10:30 position.

In some embodiments, control circuitry 404 selects the presentation speed and direction of the media asset solely based on a position of the vertex point determined at step 1204. For example, the flexible screen may be divided into several sections, each section corresponding to its own presentation speed and direction. For example, the flexible screen may be divided into several sections as shown in FIG. 3B. In one embodiment, control circuitry 404 selects the presentation speed and direction of the media asset based on which section the flexible screen the vertex point is located in. For example, if the vertex point is located in section 352 of FIG. 3B, control circuitry 404 selects "rewind" as the presentation direction and "8×" as the presentation speed. In another example, if the vertex point is located in section 364 of FIG. 3B, control circuitry 404 selects "forward" as the presentation direction and "8×" as the presentation speed.

At 1212, control circuitry 404 may select a presentation direction based on the direction of the curvature. For example, if the direction of the curvature is into the plane of the screen (e.g., as shown in Table 1), control circuitry 404 may select a "fast-forward" presentation direction. Alternatively, if the direction of the curvature is out of the plane of the screen (e.g., as shown in Table 2), control circuitry 404 may select a "rewind" presentation direction. In another example, if the direction of the curvature is horizontal (e.g., as shown in Table 1), control circuitry 404 may select a "fast-forward" presentation direction. Alternatively, if the direction of the curvature is vertical (e.g., as shown in Table 2), control circuitry 404 may select a "rewind" presentation direction.

At 1214, control circuitry 404 may select a presentation speed based on the degree of the curvature. For example, the presentation speed may be proportional to the degrees of the curvature. A sharper bend may lead to a selection of a higher speed, while a shallow bend may lead to a selection of a lower speed. For example, a 1-inch radius of the curve may correspond to 6× speed, a 2-inch radius of the curve may correspond to 4× speed, and a 4-inch radius of the curve may correspond to 2× speed.

At 1216, control circuitry 404 may present the media asset based on the selected position, the selected playback direction and the selected playback speed. For example, if the user bends the flexible screen (e.g., screen 416) as shown in FIG. 3A at element 304, control circuitry 404 may play the media asset forwards, at 2× speed from a position corresponding to a position identified by location 306 of the control bar.

Steps 1218-1222 may also be optionally performed. For example, at 1218, control circuitry 404 may check if the curvature of the flexible screen changed. If not, process 1200 goes back to 1216; otherwise, control circuitry 404 proceeds to step 1220. At 1220, control circuitry 404 may check if less than a predefined time passed (e.g., 0.5 seconds). If so, process 1200 continues at 1222; otherwise, control circuitry 404 returns to step 1216. At 1222, control circuitry 404 checks if the direction of the curvature is different from the determined direction (e.g., the location determined at 1212). If so, process 1200 proceeds to step 1224, where control circuitry 404 pauses the presentation of the media asset. In some embodiments, the presentation of the media asset is restarted if the user bends the screen once again in any direction. Otherwise, process 1200 proceeds to step 1226, where control circuitry 404 skips a portion of the media asset. For example, control circuitry 404 may skip the current scene of the media asset and continue presentation of the media asset from the next scene.

It should be noted that processes 500-1200 or any step thereof could be performed on, or provided by, any of the devices shown in FIGS. 1-4. For example, the processes may be executed by control circuitry 404 (FIG. 4) as instructed by the user interface application. In addition, one or more steps of a process may be incorporated into or combined with one or more steps of any other process or embodiment. In addition, the steps and descriptions described in relation to FIGS. 5-12 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that the methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that the methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for controlling presentation of a media asset on a flexible screen, the method comprising:
    playing the media asset on the flexible screen at a forward play direction;
    determining, by control circuitry of an electronic device, a direction of a curvature of the flexible screen and a degree of the curvature of the flexible screen;
    selecting, by the control circuitry, one of a fast forward play direction or a rewind play direction based on determining whether the direction of the curvature of the flexible screen corresponds to a deflection into a top plane of the flexible screen or to a deflection away from the top plane of the flexible screen;
    setting the rewind or fast forward speed proportional to the degree of the curvature of the flexible screen; and
    rewinding or fast forwarding the media asset based on the selecting at the set speed.

2. The method of claim 1, wherein selecting the presentation speed proportional to the degree of the curvature of the flexible screen further comprises:
    retrieving metadata associated with the media asset;
    determining, based on the metadata, a category associated with the media asset; and
    adjusting the presentation speed based on the category associated with the media asset.

3. The method of claim 1, wherein presenting the media asset on the flexible screen comprises:
    determining a location of a vertex point of the curvature of the flexible screen;
    determining, based on the location of the vertex point of the curvature of the flexible screen, a presentation position within the media asset; and
    presenting the media asset on the flexible screen based on the selected presentation direction beginning at the determined presentation position.

4. The method of claim 3, wherein the flexible screen comprises a plurality of sensors, and wherein each sensor of the plurality of sensors measures strain across a different respective portion of the flexible screen, and wherein determining the direction of the curvature comprises:
    receiving a plurality of strain measurements from the plurality of sensors; and
    identifying the direction of the curvature of the flexible screen based on the plurality of strain measurements.

5. The method of claim 4, wherein identifying the direction of the curvature of the flexible screen based on the plurality of strain measurements comprises:
    identifying a subset of strain measurements of the plurality strain measurements that exceed a predefined strain value;
    identifying the different respective portions of the flexible screen associated with the subset of sensors, of the plurality of sensors, corresponding to the plurality of strain measurements; and
    determining the direction based on the identified different respective portions of the flexible screen.

6. The method of claim 1, further comprising:
    detecting by the control circuitry, a series of rapid deflections of the screen into the top plane of the flexible screen or a series of rapid deflections of the screen away from the top plane of the flexible screen; and
    in response to detecting the series of rapid deflections, skipping to a predefined location in the media asset.

7. A system for controlling presentation of a media asset on a flexible screen, comprising control circuitry of an electronic device configured to:

play the media asset on the flexible screen at a forward play direction;
determine a direction of a curvature of the flexible screen and a degree of the curvature of the flexible screen;
select one of a fast forward play direction or a rewind play direction based on determining whether the direction of the curvature of the flexible screen corresponds to a deflection into a top plane of the flexible screen or to a deflection away from the top plane of the flexible screen;
set the rewind or fast forward speed proportional to the degree of the curvature of the flexible screen; and
rewind or fast forward the media asset based on the selecting at the set speed.

8. The system of claim 7, wherein the control circuitry is further configured, when selecting the presentation speed proportional to the degree of the curvature of the flexible screen, to:
retrieve metadata associated with the media asset;
determine, based on the metadata, a category associated with the media asset; and
adjust the presentation speed based on the category associated with the media asset.

9. The system of claim 7, wherein the control circuitry is further configured, when presenting the media asset on the flexible screen, to:
determine a location of a vertex point of the curvature of the flexible screen;
determine, based on the location of the vertex point of the curvature of the flexible screen, a presentation position within the media asset; and
present the media asset on the flexible screen based on the selected presentation direction beginning at the determined presentation position.

10. The system of claim 9, wherein the flexible screen comprises a plurality of sensors, and wherein each sensor of the plurality of sensors measures strain across a different respective portion of the flexible screen, and wherein the control circuitry is further configured, when determining the direction of the curvature, to:
receive a plurality of strain measurements from the plurality of sensors; and
identify the direction of the curvature of the flexible screen based on the plurality of strain measurements.

11. The system of claim 10, wherein the control circuitry is further configured, when identifying the direction of the curvature of the flexible screen based on the plurality of strain measurements, to:
identify a subset of strain measurements of the plurality strain measurements that exceed a predefined strain value;
identify the different respective portions of the flexible screen associated with the subset of sensors, of the plurality of sensors, corresponding to the plurality of strain measurements; and
determine the direction based on the identified different respective portions of the flexible screen.

12. The system of claim 7, wherein the control circuitry is further configured to:
detect series of rapid deflections of the screen into the top plane of the flexible screen or a series of rapid deflections of the screen away from the top plane of the flexible screen; and
in response to detecting the series of rapid deflections, skip to a predefined location in the media asset.

* * * * *